US008311921B2

(12) United States Patent
Lynner (10) Patent No.: US 8,311,921 B2
(45) Date of Patent: Nov. 13, 2012

(54) SYSTEM AND METHOD FOR DYNAMIC ORDER MANAGEMENT

(76) Inventor: Stephen Kent Lynner, Westerly, RI (US)

( * ) Notice: Subject to any disclaimer, the term of this patent is extended or adjusted under 35 U.S.C. 154(b) by 651 days.

(21) Appl. No.: 12/129,023

(22) Filed: May 29, 2008

(65) Prior Publication Data

US 2009/0083174 A1    Mar. 26, 2009

Related U.S. Application Data

(60) Provisional application No. 60/932,643, filed on Jun. 1, 2007.

(51) Int. Cl.
*G06Q 40/00* (2006.01)
(52) U.S. Cl. ....... 705/36 R; 705/35; 705/37; 705/26.41; 707/770
(58) Field of Classification Search ............. 705/35–37, 705/26.41; 707/770
See application file for complete search history.

(56) References Cited

U.S. PATENT DOCUMENTS

| | | | |
|---|---|---|---|
| 7,024,423 B1 * | 4/2006 | Aboujaoude et al. | 707/770 |
| 7,567,932 B1 * | 7/2009 | Salvadori et al. | 705/36 R |
| 2004/0064393 A1 * | 4/2004 | Luenberger | 705/36 |
| 2006/0059065 A1 * | 3/2006 | Glinberg et al. | 705/35 |
| 2008/0015970 A1 * | 1/2008 | Brookfield et al. | 705/37 |

OTHER PUBLICATIONS

Management Science "Option Pricing: Valuation Models and Applications"; Mark Broadie Graduate School of Business, Columbia University, 3022 Broadway, New York, New York 10027-6902, and Jerome B. Detemple School of Management, Boston University, 595 Commonwealth Avenue, Boston, Massachusetts 02215; Sep. 2004.*
Tabb Group, Exchange-Traded Equity Derivatives: The Buy-Side's Increasing Exposure (Mar. 2007) (54 pages).

* cited by examiner

*Primary Examiner* — Harish T Dass
(74) *Attorney, Agent, or Firm* — McCarter & English, LLP (57) ABSTRACT

Disclosed herein are systems and methods for dynamic order management. A user can specify at an order originator system an underlyer price, a pricing model, and, in accordance with the pricing model, a desired derivative price and/or desired implied volatility in the form of one or more threshold conditions at which the user desires a trade to be executed. An order executor system receives the dynamic order and a data feed having a data feed underlyer price, and, if in accordance with the pricing model, the threshold condition(s) are satisfied at the data feed underlyer price, the dynamic order is identified as being executable.

11 Claims, 2 Drawing Sheets

FIG. 2

SYSTEM AND METHOD FOR DYNAMIC ORDER MANAGEMENT

CROSS-REFERENCE TO RELATED APPLICATIONS

The present application claims the benefit under 35 U.S.C. §119(e) of U.S. Provisional App. No. 60/932,643, filed Jun. 1, 2007, which is hereby incorporated by reference in its entirety for all purposes.

FIELD OF THE INVENTION

The present invention relates generally to systems and methods for dynamic order management. In particular, preferred embodiments of the invention relate to systems and methods that facilitate the creation, communication, and/or maintenance of a dynamic order for a transaction.

BACKGROUND OF THE INVENTION

The equity options market has evolved into a vibrant and highly liquid marketplace, and it is contemplated that the turnover volume in the options marketplace has outpaced volume growth of the equity instruments underlying the options. Option volume growth, in percentage terms, is contemplated to be in excess of double the rate of growth for the securities underlying the options. For some individual equity issues, option volume represents as little as about two percent of the underlying volume to as much as about fifty percent of that volume, for example. In broad terms, it is contemplated that option volume represents about thirty to forty percent of the volume of the underlying market for securities with listed option series, and that there are about a thousand publicly traded equities with a listed options series attached to each.

While it is difficult to obtain attribution data pointing to the market segments responsible for such growth, it is contemplated that the growth is coming from two segments. The first is a more sophisticated segment of retail investors. They are likely users of on-line broker services such as TD Ameritrade or Scottrade or options specialists such as OptionsXpress. Such investors appear to be comfortable making their own execution decisions, and are contemplated as being likely to look to options as a way to hedge their holdings or, alternatively, generate additional investment income by engaging, for example, in buy-write strategies.

The second segment is the hedge fund community. The rise in options volume growth coincides with a growing market power of hedge funds. As assets under management (AUM) and the number of funds established have increased dramatically over the past five years so has options volume. Options are contemplated as being well-suited for hedge funds. Hedge funds provide leverage, both exposure as well as financial, and arbitrage opportunities and, with increasing volumes in the options markets, a means for establishing, increasing, decreasing or eliminating exposure to an instrument or sector but still minimize market impact at point of execution. In addition, with the onset of penny increment pricing with respect to options strike price increments, volume may grow at an even faster pace than recent history and pricing anomalies may be introduced. Some observations regarding the penny pilot program indicate that certain issues increased in excess of thirty-five percent in trading volume. Further, because each market-maker sets prices, pricing discrepancies have been observed between the same options series traded on different exchanges.

The discrepancy in price on different exchanges, as well as the fast pace of trading that can cause price to change over a short time, are both exemplary results of market forces that can impact upon the ultimate purchase price of an option. This presents problems to a party placing an order for an options transaction at a desired price or implied volatility, because there is typically no guarantee that the price or volatility of the option when the order was placed will be substantially the same as the price or volatility at the time (and place) when the order is executed or identified as being executable. Compounding this problem is that an executor cannot initiate such a transaction absent knowledge that such transaction is authorized by the originator.

What is needed in the art is a system and method for managing an order between an originator and an executor, such that the executability of the order in view of changed circumstances is effectively managed.

SUMMARY OF THE INVENTION

The present invention overcomes the disadvantages and shortcomings of the prior art by providing systems and methods for managing a dynamic order. In an exemplary embodiment of the present invention, a dynamic order is provided with a plurality of order attributes, including an underlyer order attribute, an underlyer price order attribute, a derivative price order attribute corresponding to the underlyer order attribute, an implied volatility order attribute corresponding to the underlyer order attribute, and a plurality of additional order attributes, such as a risk free rate order attribute, a dividend yield order attribute, etc.

In the exemplary embodiment, the underlyer order attribute, the underlyer price order attribute, and the plurality of additional order attributes are populated with data at an originator system. One of the derivative price order attribute and the implied volatility order attribute is populated with a derivative price threshold condition and an implied volatility threshold condition, respectively. Each of the derivative price threshold condition and the implied volatility threshold condition can be associated with, for example, at least one of a target value, a target minimum value, a target maximum value, a target value range, etc.

An applicable pricing model for the dynamic order is preferably selected at the originator system from a plurality of pricing models. The relationships by and among the order attributes, which are referenced herein as attribute relationships, are defined at least in part by the applicable pricing model for the dynamic order. The attribute relationships are substantially static in accordance with the rules of the applicable pricing model (though the attribute relationships can be re-defined by selecting a replacement pricing model, for example), while certain order attributes themselves are dynamic. If the derivative price order attribute is populated with the derivative price threshold condition, the originator system populates the implied volatility order attribute with an implied volatility threshold condition generated in accordance with the applicable pricing model. If the implied volatility order attribute is populated with the implied volatility threshold condition, the originator system populates the derivative price order attribute with a derivative price threshold condition generated in accordance with the applicable pricing model. The originator system initiates transfer of the dynamic order to the executor system.

The executor system receives the dynamic order and further receives a financial data feed in real time having a data feed underlyer price corresponding to the underlyer of the dynamic order. Using the applicable pricing model, the data feed underlyer price is processed together with data from the order attributes to determine whether the implied volatility threshold condition and/or the derivative price threshold condition are "satisfied" at the data feed underlyer price, e.g., whether the derivative price and/or implied volatility corresponding to the data feed underlyer price under the applicable pricing model is equal to a value of the corresponding condition, more than a minimum value of the corresponding condition, less than a maximum value of the condition, within the value range of the corresponding condition, etc. The dynamic order is identified as being executable by the executor system if one or more of the following two conditions are met: (1) the implied volatility threshold condition is satisfied at the data feed underlyer price; and (2) the derivative price threshold condition is satisfied at the data feed underlyer price.

Additional features, functions and benefits of the disclosed systems and methods for dynamic order management will be apparent from the detailed description which follows, particularly when read in conjunction with the accompanying figures.

BRIEF DESCRIPTION OF THE DRAWINGS

For a more complete understanding of the present invention, reference is made to the following detailed description of exemplary embodiment(s) considered in conjunction with the accompanying drawings, in which.

DETAILED DESCRIPTION OF THE EXEMPLARY EMBODIMENTS

Figure 1:
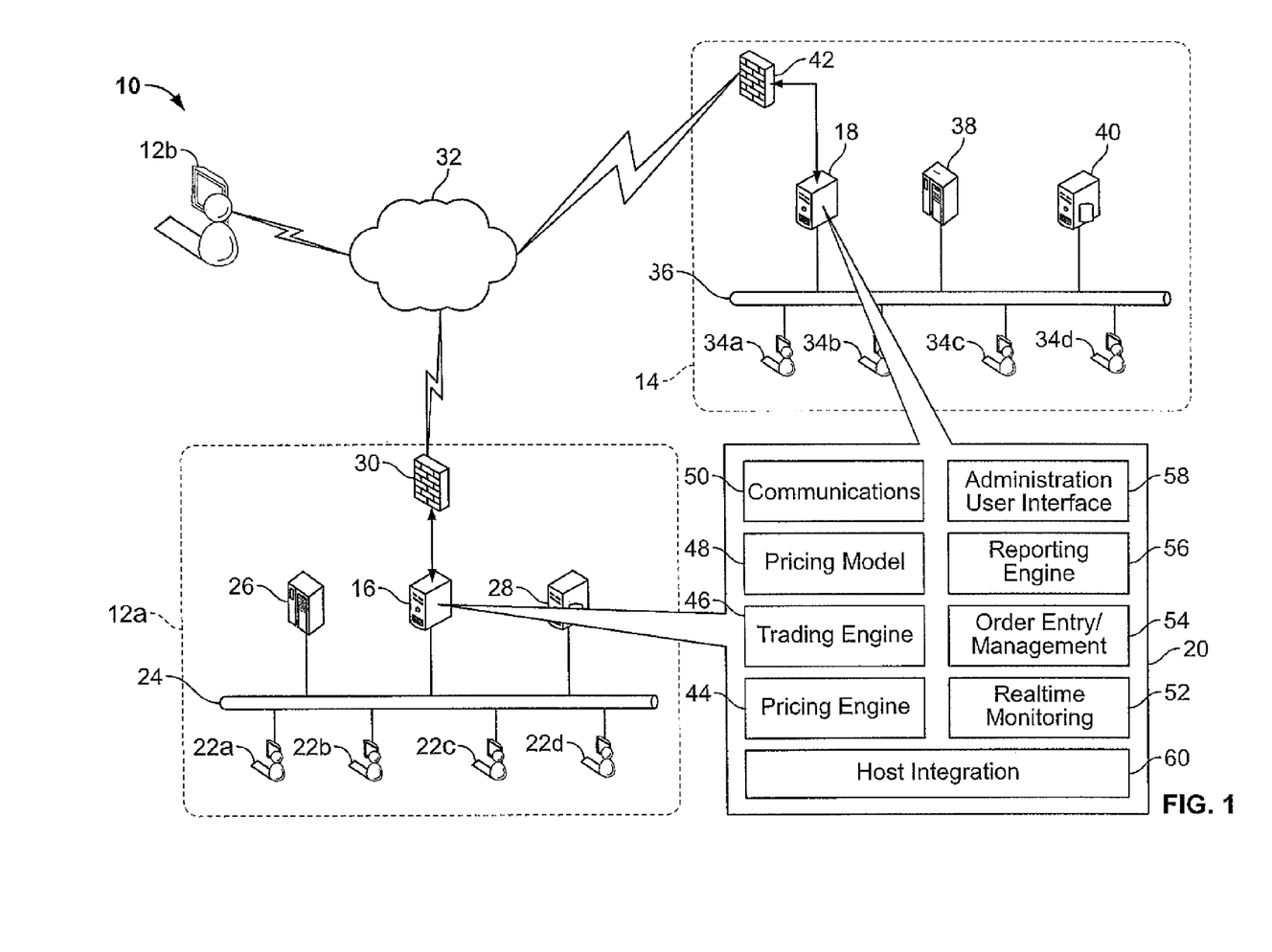
FIG. 1 is a network diagram showing an exemplary network for implementing an exemplary embodiment of a dynamic order management method.

Referring to FIG. 1, a dynamic order management network 10 is shown to include a plurality of originator systems 12*a-b* and an executor system 14. The exemplary originator system 12*a* includes an originator-side derivatives server 16, and the executor system 14 includes an executor-side derivatives server 18. FIG. 1 also shows exemplary modules 20 that are preferably resident on the originator-side derivatives server 16 and/or the executor-side derivatives server 18, though such modules 20 will be discussed in greater detail below after the originator and executor systems 12*a-b*, 14 have been discussed with further detail.

The originator system 12*a* is preferably responsible for developing a dynamic order and initiating transfer of the dynamic order directly and/or indirectly to the executor system 14, while the executor system 14 is preferably responsible for identifying whether the dynamic order is executable (and, in some circumstances, executing the dynamic order). It is contemplated that the originator system 12*a* is operated, used, and/or managed by a "buyer," such as a trader, in a transaction for a derivative, while the executor system 14 is operated, used, and/or managed by an agent of the buyer charged with initiating execution of the dynamic order, such as a "broker-dealer." Though exemplary reference is made herein to option contracts as a type of derivative, it shall be understood that the present invention contemplates additional and/or alternative types of derivatives, such as equities, futures, commodities, interest rate derivatives, interest rate options, interest rate futures, foreign exchange options, foreign exchange futures, etc.

The originator system 12*a* includes hardware and/or software suitable for implementing development, creation, and/or transfer initiation of the dynamic order. For example, the originator system 12*a* includes at least one originator-side computer terminal 22*a* or, more preferably, a plurality of originator-side computer terminals 22*a-d*. Each one of the originator-side computer terminals 22*a-d* includes hardware components such as an electronic processor, an electronic memory device, an input device (mouse, keyboard, etc.), a display device, a network interface device, etc. and is a node along a wired and/or wireless communication line, referenced herein as an originator subnet 24. A server, which is referenced herein as an originator-side host server 26, is in communication with the originator-side computer terminals 22*a-d* and the originator-side derivatives server 16 along the originator subnet 24. An originator-side database server 28 is provided in communication with originator-side computer terminals 22*a-d*, the originator-side derivatives server 16, and the originator-side host server 26 via the originator-side subnet 24. The originator-side host server 26, the originator-side derivatives server 16, and the originator-side database server 28 can have hardware and/or software modules resident thereon for facilitating performance of methods managed by users of the originator-side computer terminals 22*a-d*. The originator-side derivatives server 16 is in communication with an originator-side firewall 30, and a virtual private network (VPN) or other secure communication is established with the executor system 14 over a network 32, such as the Internet.

Any suitable network topography for implementing the methods herein described can be utilized. For example, it is contemplated that an originator system having the functionality for implementing the methods herein described can include a single home computer system (desktop or laptop), such as the originator system 12*b* shown in FIG. 1, which is particularly suitable and efficient for individual traders who desire to create and initiate transfer of a dynamic order. Though exemplary discussion is made herein with respect to the originator system 12*a*, it shall be understood that discussion concerning the originator system 12*a* is also applicable to other originator systems, such as the originator system 12*b* of FIG. 1.

Continuing with reference to FIG. 1, the executor system 14 includes hardware and/or software suitable for receiving the dynamic order and a financial data feed, such as an electronic ticker, and identifying if the dynamic order is executable, e.g., authorized. For example, the executor system 14 includes at least one executor-side computer terminal 34*a* or, more preferably, a plurality of executor-side computer terminals 34*a-d*. Each one of the executor-side computer terminals 34*a-d* includes hardware components such as an electronic processor, an electronic memory device, an input device (mouse, keyboard, etc.), a display device, a network interface device, etc. and is a node along a wired and/or wireless communication line, referenced herein as an executor subnet 36. A server, which is referenced herein as an executor-side host server 38, is in communication with the executor-side computer terminals 34*a-d* and the executor-side derivatives server 18 along the executor-side subnet 36. An executor-side database server 40 is provided in communication with executor-side computer terminals 34*a-d*, the executor-side derivatives server 18, and the executor-side host server 38 via the executor subnet 36. The executor-side host server 38, the executor-side derivatives server 18, and the executor-side database server 40 can have hardware and/or software modules resident thereon for facilitating performance of methods managed by users of the executor-side computer terminals 34*a-d*. The executor-side derivatives server 18 is in communication with an executor-side firewall 42, and secure communications are established with the originator system 12a using secure communications, e.g., VPN, over the network 32.

A system for generating the financial data feed, e.g., electronic ticker, is provided (not shown). Such system is known in the art, and the executor system 14 is adapted to receive the financial data feed and extract the data thereof to manage the dynamic order. The dynamic order management network 10 can include additional and/or alternative hardware and/or software systems.

Continuing with reference to FIG. 1, the originator-side derivatives server 16 and the executor-side derivatives 18 server include a plurality of modules 20 for implementing the methods herein described. It is contemplated that these modules 20 can be provided in any suitable language and include the following examples: (1) a pricing engine module 44 for providing strategy inputs (discussed below) to the applicable pricing model for valuation; (2) a trading engine module 46 resident on the originator system 12a for populating a limit order template with strategy outputs (discussed below); (3) pricing model modules 48 resident on the originator-side derivatives server 16 for processing the dynamic order in accordance with an applicable pricing model and resident on the executor-side derivatives server 18 for processing the dynamic order in accordance with the data feed underlyer price; (4) communications modules 50 resident on the originator-side and executor-side derivatives servers 16, 18 for facilitating communication of the dynamic order between the originator network 12a and the executor network 14 in a common protocol, such as the financial information exchange (FIX) protocol in version 4.4 or other communications protocol used to facilitate the exchange of financial transactional information; (5) a real-time monitoring module 52 resident on originator-side and executor-side derivatives servers 16, 18 for polling the financial data feed and extracting data thereof corresponding to an underlyer order attribute of the dynamic order, such as the corresponding data feed underlyer price; (6) order entry and management modules 54 resident at the originator-side and executor-side derivatives servers 16, 18 for managing and maintaining the order attributes and attribute relationships; (7) reporting engine modules 56 resident at the originator-side and executor-side derivatives servers 16, 18 for generating paper (and/or electronic) reports concerning the dynamic order; and (8) administration user interface (UI) modules 58 resident at the originator-side and executor-side derivatives servers 16, 18 for facilitating input and output of information to users of the originator system 12a and the executor system 14, respectively. It is contemplated that modules 44-58 can be written in any suitable language (and/or include hard-wired logic), and that host integrations modules 60 are provided for compatibility purposes, e.g., integrating the modules 44-58 with the operating system and other hardware and/or software of the originator-side and executor-side derivatives servers 16, 18.

At the originator system 12a, a framework is presented for dynamic order submission, in which information is provided by operations management software options, and pricing analytics are produced with such information for transmission to the executor system 14. A template, which is referenced herein as a limit order template, is populated in accordance with pricing, which becomes order instructions conveyed by an originator, e.g., a customer such as a trader, to an executor, e.g., a broker/dealer. The applicable pricing model applied to a dynamic order at the originator system 12a is consistent with the pricing model applied to the dynamic order at the executor system 14. The dynamic order is in communication with a live data feed so that the relational prices, such as the derivative price, are updated as the price of the underlying instrument changes. Though exemplary reference is made herein to a stock (a.k.a. cash) as a type of underlyer, it shall be understood that the present invention contemplates additional and/or alternative types of underlyer, such as equities, futures, commodities, interest rate securities, foreign exchange currency, fixed income securities, derivatives of fixed income securities including interest rate swaps, etc.

Figure 2:
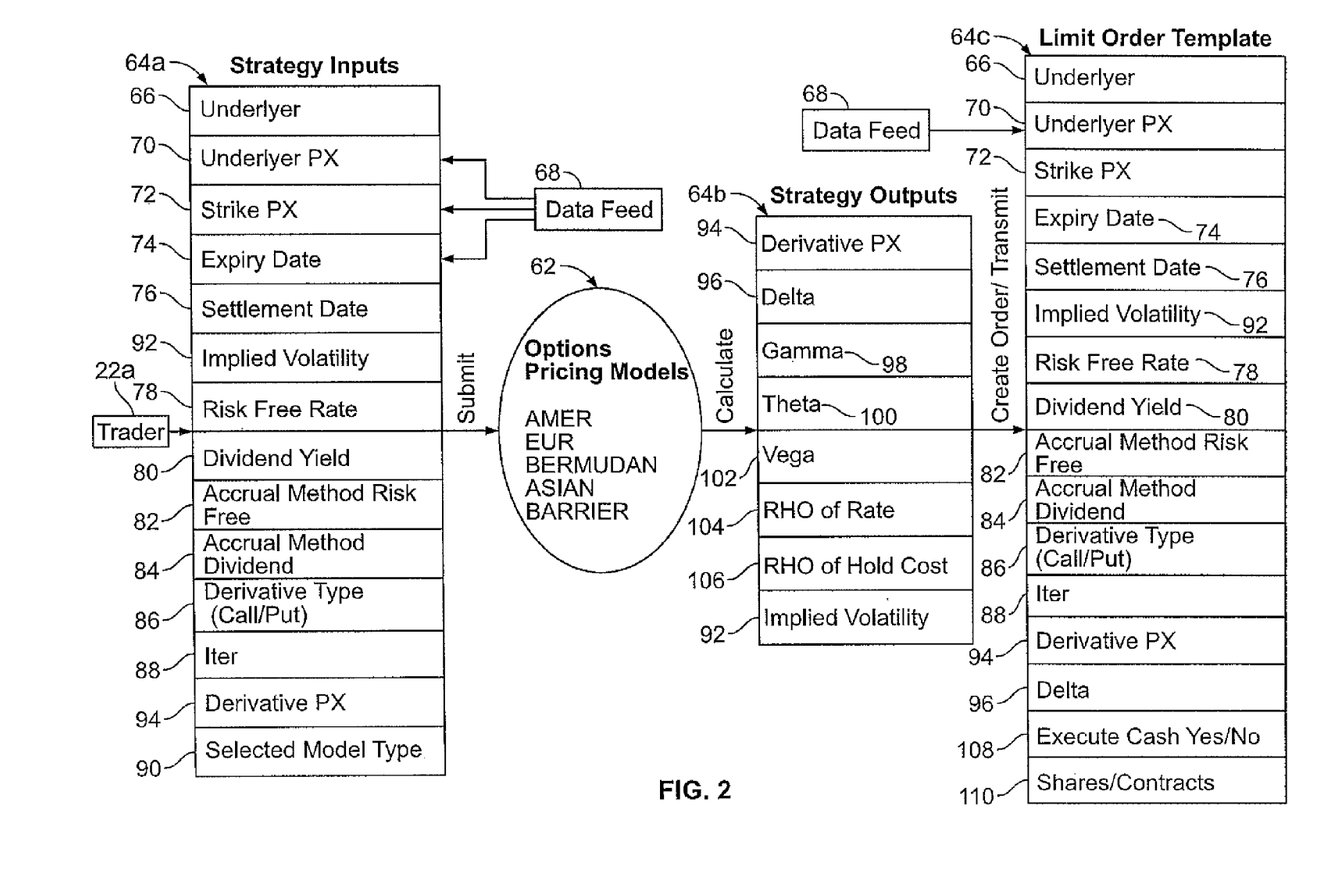
FIG. 2 is a diagram showing an exemplary dynamic order with exemplary order attributes thereof.

Referring to FIG. 2, the dynamic order shall be discussed with further detail in connection with order attributes. In the exemplary embodiment, the dynamic order is created by a trader at one of the plurality of originator-side computer terminals 22a-d of the originator system 12a. The trader is preferably at the buy-side of a trading desk, e.g., at the buy-side of a physical venue designated by an originator-side entity as a place at which transactions are formulated and conveyed for execution. Typically the trader is an individual responsible for trading/portfolio management and will invoke a software application, e.g., the order/entry management module 54, to enable creation of the dynamic order using the administration UI module 58.

Using the administration UI module 58, the user can select a pricing model from a plurality of pricing models 62. Such pricing includes, for example, one of the options pricing models known in the art, such as the American Pricing Model, the European Pricing Model, the Bermudan Pricing Model, the Asian Pricing Model, the Barrier Pricing Model, and any other suitable pricing model known in the art. In this regard, it is contemplated that one of the screens displayed to the trader can include and/or import functions for all the positions (underlyer) the trader may have in their portfolio. For example, such portfolios may be imported from another system, such as an order management system. As another example, the trader may create their own portfolio and/or may individually enter each underlyer into an originator system database. It is contemplated that the initial screen can include functionality concerning multiple and disparate underlyers. As will be described with further detail below, the applicable pricing model facilitates derivation of the derivative price and/or the implied volatility associated with the underlyer.

Using terminal 22a, the trader invokes an input screen and creates an instance of the dynamic order and populates a first set of order attributes 64a, referenced herein as strategy inputs. The trader populates an underlyer order attribute 66 with the identity of the underlyer for which the financial instrument, e.g., options contracts, derives from. For example, the trader "drags and drops" (clicks) a stock symbol from a plurality of stock symbols presented on the display device of the terminal 22a, particularly if the underlyer is a "listed" or Over-The-Counter (OTC) security.

Though input to the dynamic order can be made manually, it is contemplated that certain order attributes 64a can be retrieved from a financial data feed 68 known in the art. For example, identification of a specific underlyer as the underlyer order attribute 66 for the dynamic order prompts a price retrieval of the then-current price of the underlyer from the financial data feed 68 and populates an underlyer price order attribute 70 with same. In the event that the market was not open at such time, the closing price of the prior business day is retrieved for population of the underlyer price order attribute 70. Similarly, the strike price for the underlyer is retrieved from the financial data feed 68 to populate a strike price order attribute 72, and the expiration date for such strike price is retrieved from the financial data feed 68 to populate an expiry date order attribute 74. In the event that the underlyer is not listed, the strike price order attribute 72 and/or expiry date order attribute 74 can be populated manually (and/or by retrieving data from another suitable financial data feed). Information from the financial data feed, including underlyer price, is integrated into a virtual trading blotter (discussed further below) for a dynamic order and/or financial instrument transaction. The data price feed will cause the economic values of the originally proposed financial instrument transaction to be modified based upon the significance of the difference between the price at the time of instrument creation and the price of the instrument after more recent prices are received.

Additional order attributes 64*a* are populated with data manually and/or from a suitable data feed known in the art. For example, a settlement date order attribute 76 is populated with the date on which the derivative price was valued. It is contemplated that the following additional order attributes are populated with data at the originator systems 12*a*: (1) a risk-free rate order attribute 78, which is populated with data representing the rate of interest earned on a risk free instrument (typically the interest rate quoted on the 30 day Treasury Bill); (2) a dividend yield order attribute 80, which is populated with data representative of the rate return calculated by dividing the historic dividend value paid on the subject underlyer, e.g., equity security, by the price of same, such that, if the data feed provides the dividend value, the rate of return is calculated prior to populating the dividend yield order attribute 80; (3) an accrual method risk free order attribute 82, which is populated with accrual method risk free data obtained from using the financial modeling software known in the art, such as FINCAD by the FinancialCAD Corporation; (4) an accrual method dividend order attribute 84, which is populated with accrual method dividend data that can be obtained from using the financial modeling software; (5) an option type order attribute 86, which is preferably manually populated with data representative of a simple call, a simple put, a strangle in which both a put and a call are part of the same dynamic order, a buy write to open, a buy write to close, a pegged purchase (e.g., buy options at prices pegged to the underlyer), a strike price spread, a calendar and/or multi-leg spreads for all order types, a pegged straddle, a pegged strangle, other, etc.; and (6) an Iter order attribute 88, which is populated with data that can be obtained from using financial modeling software and which is representative of the number of steps in a binomial tree with respect to the valuation algorithm employed for the applicable pricing model. Additional order attributes 64*a* can be provided, such as an order attribute for associating data, e.g., string data, having descriptive terms identifying a financial future, etc.

It is contemplated that the dynamic order includes a selected model type order attribute 90, which is populated with data representative of the applicable pricing model selected from the plurality of pricing models 62. It is contemplated that the applicable pricing model populating the selected model type order attribute 90 of the dynamic order is selected at an initial screen, though the applicable pricing model can be selected with any suitable screen and at any suitable point.

The dynamic order includes an implied volatility order attribute 92 and a derivative price order attribute 94. The implied volatility order attribute 92 and the derivative price order attribute 94 are functions of the order attributes 66-90 (including the selected one of the pricing models 62) and are static when the order attributes 66-90 remain constant. For example, when the implied volatility order attribute 92 is populated with a value (or range thereof) representative of implied volatility, the originator system 12*a* populates the derivative price order attribute 94 with the corresponding value (or corresponding range thereof) in dependence upon the order attributes 66-90 and flags/identifies the derivative price order attribute 94 as being representative of "fair value." Similarly, when the derivative price order attribute 94 is populated with a value (or range thereof representative of a desired derivative price, the originator system 12*a* populates the implied volatility order attribute 92 with a value (or corresponding range thereof representative of a corresponding implied volatility. The data entered in the implied volatility order attribute 92 and the derivative price order attribute 94 are referenced herein as an implied volatility threshold condition and a derivative price threshold condition, respectively, as such data is representative of the conditions under which the dynamic trade is executable, e.g., authorized by the user of the originator system 12*a*. The derivative price threshold condition and the implied volatility threshold condition can be values and/or value ranges, such as a target value, a target minimum value, a target maximum value, a target value range, etc. When providing the strategy inputs, a user of the originator system 12*a* can leave "blank" (null) one of the implied volatility order attribute 92 and the derivative price order attribute 94, as the blank one can be derived during valuation in accordance with the applicable pricing model identified by the selected model type order attribute 90.

Continuing with reference to FIG. 2, the originator system 12*a* submits the dynamic order with the first set of order attributes 64*a* (strategy inputs) for processing in accordance with the applicable pricing model. For example, the pricing model modules 48 processes the dynamic order in accordance with the applicable pricing model to derive a second set of order attributes 64*b*, which are referenced herein as strategy outputs. If the user of the originator system 12*a*, e.g., a trader, was trying to solve for the derivative price order attribute 94 by having provided an implied volatility threshold condition with the first set of order attributes 64*a* (and by leaving the derivative price order attribute 94 as null or blank), then the applicable pricing model will populate the derivative price order attribute 94 of the second set of order attributes 64*b* with the derivative price threshold condition corresponding to the implied volatility threshold condition. Otherwise, the derivative price threshold condition for the derivative price order attribute 94 will remain substantially the same as the derivative price threshold condition populated in the first set of order attributes 64*a*. If the trader was trying to solve for the implied volatility order attribute 92 by having provided a derivative price threshold condition with the first set of order attributes 64*a* (and by leaving the implied volatility order attribute 92 as null or blank), then the applicable pricing model will populate the implied volatility order attribute 92 of the second set of order attributes 64*b* with the implied volatility threshold condition corresponding to the derivative price threshold condition. Otherwise, the implied volatility threshold condition for the implied volatility order attribute 92 of the second set of order attributes 64*b* will remain substantially the same as that implied volatility threshold condition populated in the first set of order attributes 64*a*.

Application of the pricing model to the first set of order attributes 64*a* can populate additional order attributes 64*b*, such as the following: (1) a delta hedge ratio order attribute 96, which is populated with data representing a measure of the rate of change in a derivative's theoretical value for a one-unit change in the price of the underlyer, e.g., an underlying stock; (2) a gamma order attribute 98, which is populated with data representing a measure of the rate of change in a derivative's delta for a one-unit change in the price of the underlyer; (3) a theta order attribute 100, which is populated with data representing a measure of the rate of change in a derivative's theoretical value for a one-unit change in time to the derivative's expiration date; (4) a vega order attribute 102, which is populated with data representing a measure of the rate of change in a derivative's theoretical value for a one-unit change in the implied volatility assumption; (5) a rho of rate order attribute 104, which is populated with data representative of the rate of change in the derivative's theoretical value for a one unit of change in the risk free rate; and (6) a rho of hold cost order attribute 106, which is populated with data representative of the rate of change in the derivative's theoretical value for a one unit of changing in the holding cost.

If the user of the originator system 12a, e.g., a trader, is satisfied with the implied volatility threshold condition and the derivative price threshold condition included in the second set of order attributes 64b, e.g., the strategy outputs from the pricing model, the user can approve the order attributes 64a-b and prepare the dynamic order for transmission by populating a limit order template. However, if the user is not satisfied, the user can execute a command, referenced herein as a modify strategy input command, to again view the original input table of the first set of order attributes 64a. In this regard, the user can input a replacement implied volatility threshold condition and/or a replacement derivative price threshold condition in the implied volatility order attribute 92 and/or the derivative price order attribute 94, respectively. The applicable pricing model is applied again, and the user ascertains whether the user is satisfied with the replacement implied volatility threshold condition and the replacement derivative price threshold condition included in the second set of order attributes 64b. The user can continue this process until the user is satisfied with the second set of order attributes and approves the order attributes 64a-b. The user selects the destination of the dynamic order and invokes a limit order template for transmission of the dynamic order to a desired one of a plurality of executor systems, such as the executor system 14. Transmission to the executor system 14 is initiated for secure communications, such as over a VPN and preferably in accordance with the FIX protocol or other suitable protocol convention utilized in the transmission of financial transactional information.

Continuing with reference to FIG. 2, the dynamic order, as embodied in the limit order template, includes a third set of order attributes 64c, which includes some of the order attributes 64a-b, which are copied into the limit order template. For example, the third set of order attributes 64c can include the following from the first set of order attributes 64a: the underlyer order attribute 66; the underlyer price order attribute 70; the strike price order attribute 72; the order expiry date order attribute 74; the settlement date order attribute 76; the risk free rate order attribute 78; the dividend yield order attribute 80; the accrual method risk free order attribute 82; the accrual method dividend order attribute 84, the derivative type order attribute 86; and the iter order attribute 88. From the second set of order attributes 64b, the third set of order attributes 64c includes, for example, the delta order attribute 96.

The third set of order attributes 64c includes the implied volatility order attribute 92 and the derivative price order attribute 94. For example, if the user of the originator system 12a, e.g., a trader, was trying to solve for the derivative price order attribute 94, e.g., fair value, by having provided an implied volatility threshold condition in the implied volatility order attribute 92 of the first set of order attributes 64a, then the implied volatility order attribute 92 of the third set of order attributes 64c is populated with implied volatility threshold condition from the implied volatility order attribute 92 of the first set of order attributes 64a and the derivative price threshold condition from the derivative price order attribute 94 of the second set of order attributes 64b. As another example, if the user was trying to solve for the implied volatility order attribute 92 by having provided a derivative price threshold condition in the derivative price order attribute 94 of the first set of order attributes 64a, then the derivative price order attribute 94 of the third set of order attributes 64c is populated with the implied volatility threshold condition from the implied volatility order attribute 92 of the second set of order attributes 64b and the derivative price threshold condition from the derivative price order attribute 94 of the first set of order attributes 64a.

The third set of order attributes 64c includes an execute cash order attribute 108 and a share/contracts order attribute 110. The execute cash order attribute 108 is populated at the originator system 12a with data representative of whether the user authorizes the executor system 14 to execute underlying cash along with the dynamic order embodied in the limit order template. For example, if the original trade was a "buy-write," the trader (the originator system 12a) would instruct the broker/dealer (the executor system 14) to buy the applicable number of shares represented by data in the delta order attribute 96 of the second and third sets of order attributes 64b-c. A "buy-write" reflects the trader's instruction to execute cash coincident with the options or other derivative. Such instructions can be reflected in a "yes" instruction, while a "no" instruction informs the executor not to execute cash coincident with the derivatives. The shares/contracts order attribute 110 is populated with data representative of the size of the dynamic order, such as the number of shares (if cash is to be executed) or the number of options contracts or other derivatives.

The dynamic order embodied in the limit order template is assigned a unique identifier, such as a transaction ID number, and transmission to the executor system 14 is initiated. It is preferable for the executor system 14 to have each attribute of the third set of order attributes 64c so that the executor can re-price the dynamic order as the absolute values of the data changes in the marketplace. The attributes of the third set of order attributes 64c that are subject to change over time as a consequence of receiving more current price information from the financial data feed 68 include the following: underlyer price; dividend yield; options price (or other derivative price); delta; and shares if cash were to be executed coincident with the options transaction. The executor system 14 obtains this data from the financial data feed 68, for example, applies the applicable (originator-selected) pricing model to the data feed values, and re-produces the relational value equivalent of the dynamic order embodied in the limit order template.

In this regard, a re-priced order is calculated having re-priced implied volatility data and re-priced derivative price data. In the event that the re-priced implied volatility data and the re-priced derivative price data satisfy the implied volatility threshold condition and the derivative price threshold condition, respectively, that populate the third set of order attributes 64c, the dynamic order template is identified as being executable by the executor system 14 (e.g., users of the executor system 14 have authorization from the user of the originator system 12a to execute the dynamic order). Otherwise, and absent manual override, the dynamic order is identified as being non-executable by the executor system 14. In the event that the dynamic order is identified as being executable by the executor system 14, the executor system 14, in some embodiments of the invention, will execute the dynamic order electronically and/or manually in accordance with suitable methods known in the art.

In the event that the dynamic order is identified as being non-executable by the executor system 12*a*, the executor system 14 will continuously poll the financial data feed 68 or other data feed in real time and recalculate re-priced implied volatility data and re-priced derivative price data until such time as when one of the following events occur: (1) the re-priced implied volatility data and re-priced derivative price data satisfy the implied volatility threshold condition and derivative price threshold condition, respectively (in which the dynamic order is identified as being executable); and/or (2) the polling process is manually and/or electronically terminated, such as at the conclusion of the business day or the order is cancelled by the originator.

It is contemplated that embodiments of the systems and method for dynamic order management can be implemented with any suitable hardware and/or software known in the art. In this regard, discussed below are exemplary embodiments of the user interfaces at the originator system 12*a* and the executor system 14, which can be implemented in connection with the administration UI modules 58.

At the originator system 12*a*, an initial screen is presented with portfolio import capability, including equity positions concerning the underlyer, as well as options positions concerning the underlyer. A visual workspace is provided as a graphical user interface (GUI) in which the screen has a field to click on equity positions from a portfolio view on same page, an ability to insert new equity into the workspace, and a drop down menu for order types, such as buy/write, straddle, straggle, calendar spread, multi-leg, other. A prompt is provided for put/call (and multiple prompts are provided in the event that a strategy is multi-leg, for example. Prompts are provided for the expiry month, such as a drop down menu, or a "highlight and fill box" with a selected month that ties back to whether the dynamic order applies to a put or call. A prompt is provided for the strike price, such as a drop down menu-highlight and fill box with selected price that ties back to whether the dynamic order is a put or call. It is further contemplated that the initial screen allows for the viewing of the re-pricing of the dynamic order with one of the plurality of pricing models 62. Data entered for the risk free rate order attribute 78 can be saved for future instances of a dynamic order, and a prompt is provided requesting the user whether such data is to be saved.

A virtual trading blotter can be provided at the originator system 12 for importing, creating, and managing a plurality of dynamic orders, where each one of the dynamic orders relate to the same or a different underlyer, for example. Exemplary embodiments of the virtual trading blotter are comprised of a variety of financial trading parameters, e.g. order attributes, identifying a proposed financial instrument transaction. The virtual trading blotter can be provided to have individual segregated fields containing the financial terms, e.g., order attributes, specific to a proposed financial instrument transaction. A proposed financial instrument transaction, e.g., a dynamic order, can be created by order originator, e.g., originator system 12*a*, and electronically submitted to the order executor, e.g., executor system 14, for execution. The modification of the economic values and certain of the financial trading parameters of the financial instrument, e.g., data populating at least some of the order attributes 64*a-c*, can be accomplished by having the financial data feed 68 programmatically integrated into the virtual trading blotter. The programmatically altered economic values and certain of the financial trading parameters of the financial instrument produce modified financial trading parameters. The modified financial trading parameters are the product of economic calculation produced in accordance with one of the plurality of pricing models 62, which can be embedded in the virtual trading blotter. The applicable pricing model recalculates the economic values and certain of the financial trading parameters based upon valuation algorithms accepted by users of the originator system 12*a* and/or executor system 14*a*. The modified financial trading parameters succeed and replace the original financial trading parameters submitted by the order originator. The programmatically modified financial trading parameters become the successor order to the order originally conveyed by the order originator to the order executor.

Input values for the dynamic orders are mapped behind the imported dynamic order so that when a dynamic order is submitted to the executor system 14, the attribute relationships are maintained, including an identification of the applicable pricing model. A destination prompt identifying a plurality of executor systems for selection of one thereof is provided as an auto fill form or a drop down menu of available executor systems.

For a working order, e.g., a dynamic order for which the limit order template has been submitted to the executor system 14, such order can be saved for later management at a virtual trading blotter. The dynamic order submitted as a limit order template appears as a "working order" on the virtual trading blotter, indicating that the dynamic order had been submitted, and a "time-stamp" is provided indicating at what date and time the dynamic order was submitted. The virtual trading blotter enables the trader or other authorized user of the originator system 12*a* to view a list of working orders in a number of ways. For example, the user can view the working orders by pressing a "calculate" button to refresh the strategy outputs by polling the financial data feed 68 for the most current data concerning the underlyer.

The user, e.g., trader, is presented with an option of canceling and/or modifying a working order. The user can view and sort the working orders by the identity of the executor system 14 that is responsible for that working order. It is further contemplated that the working orders can be viewed and sorted by one of the order attributes 64*a-c*. For example, a trader at the originator system 12*a* can view all data populating the order attributes 64*a-c* at the executor system 14 to confirm that the prices and other values received by the executor system 14 conform to the strategy inputs and strategy outputs provided at the originator system 12*a*. In performing such confirmation, the user confirms that the dynamic order embodied in the limit order template comports with the original instructions notwithstanding the change, if any, in absolute values of the data entered in the order attributes 64*a-c*. It is further contemplated that the virtual trading blotter includes functionality to allow the user of the originator system 12*a* to export all executed orders (as communicated to the originator system 12*a* from the executor system 14) to a middle office of the user, such as an institutional user.

Similarly, at the executor system 14, a virtual trading blotter is presented at an initial screen of one of the executor-side terminals 34*a-d*, for example. The virtual trading blotter displays one or more of the dynamic orders received by the executor system 14, including dynamic orders from disparate originator systems. Each one of the dynamic orders are provided with a unique identifier, such as a transaction ID number, and virtual trading blotter displays the third set of order attributes 64*c* of the dynamic order, and, in some embodiments of the invention, the first and/or second order attributes 64*a-b* of the dynamic order. It is contemplated that the virtual trading blotter provides the user of the executor system 14 with an option to accept or reject the dynamic order (regardless of whether the dynamic order is executable), and to communicate with the originator system 12a to put the user thereof on notice of whether the dynamic order has been accepted or rejected.

The virtual trading blotter at the executor system 14 displays all working orders (and/or those working orders which have been accepted). Such display can be provided so that all dynamic orders received from a particular originator system 12a are displayed. The display can alternatively and/or additionally be provided so as to display all dynamic orders corresponding to the same underlyer. It is contemplated that working orders can be sorted by put/call, by expiration date, etc. Each of the displays are "price feed enabled," such that data associated with the derivative price order attribute 94 and the implied volatility order attribute 92 is continuously re-calculated as the underlyer price received from the financial data feed 68 changes. It is contemplated that the virtual trading blotter of the executor system 14 provides a user interface, such as a button, which can be actuated to execute a dynamic order after same has been identified as being executable, e.g., after the derivative price threshold condition and/or the implied volatility threshold condition have been satisfied. Execution of the dynamic order can be implemented in any suitable way known in the art, such as by transmission of the dynamic order to an exchange and/or such as by processing of the dynamic order in an optimization/matching engine, which may be proprietary to a broker-dealer managing the executor system 14. Reports can be generated from the virtual trading blotter at the executor side 14, including, for example, an execution report containing the attributes 64c of the dynamic order, along with any components different from that received by the originator system 12a.

It is contemplated that embodiments of the system and method for dynamic order management can be adapted to fit options trading activities for both futures and commodities. The pricing models and order templates are broadly similar and, in some instances, interchangeable. For example, it is contemplated that dynamic order management can accommodate various options classes, including equities, futures, commodities, interest rate derivatives, interest rate options, interest rate futures, foreign exchange options, foreign exchange futures, etc.

It will be understood that the embodiments of the present invention described herein are merely exemplary and that a person skilled in the art may make many variations and modifications without departing from the spirit and scope of the invention. All such variations and modifications, including those discussed above, are intended to be included within the scope of the invention as defined in the appended claims.

What is claimed is:

1. A method of electronically managing a dynamic order, comprising:
    providing a dynamic order having a plurality of order attributes including an underlyer order attribute, an underlyer price order attribute corresponding to the underlyer order attribute, a derivative price order attribute corresponding to the underlyer price order attribute, and an implied volatility order attribute corresponding to the underlyer price order attribute;
    at an originator computer system, associating the dynamic order with a pricing model selected from a plurality of options pricing models that can derive implied volatility and populating (i) an underlyer into the underlyer order attribute, (ii) an underlyer price into the underlyer price order attribute, (iii) a user-selected threshold condition into one of the derivative price order attribute and the implied volatility order attribute, and (iv), in accordance with the pricing model and the user-selected threshold condition, a calculated threshold condition into the other one of the derivative price order attribute and the implied volatility order attribute; and
    at an executer computer system, receiving the dynamic order and a financial data feed having a data feed underlyer price corresponding to the underlyer, and identifying the dynamic order as executable if the data feed underlyer price, in accordance with the pricing model, satisfies the user-selected threshold condition and the calculated threshold condition and, if the threshold condition has not been satisfied, continuously polling the financial data feed for calculating re-priced implied volatility data and re-priced derivative price data in accordance with the pricing model until the earliest of satisfaction of the threshold condition and termination;
    wherein identifying as executable comprises identifying a trade as authorized by a user of the originator computer system for execution.

2. The method of claim 1, wherein populating the user-selected threshold condition includes populating the user-selected threshold condition into the derivative price order attribute, and wherein populating the calculated threshold condition includes populating the calculated threshold condition into the implied volatility order attribute.

3. The method of claim 1, wherein populating the user-selected threshold condition includes populating the user-selected threshold condition into the implied volatility order attribute, and wherein populating the calculated threshold condition includes populating the calculated threshold condition into the derivative price order attribute.

4. The method of claim 1, wherein the user-selected threshold condition is associated with a target value.

5. The method of claim 1, wherein the user-selected threshold condition is associated with at least one of a target minimum value, a target maximum value, and a target value range.

6. An executor computer system for facilitating execution of a trade in accordance with a threshold condition selected remotely over a network by a user of an originator computer system, the executor computer system comprising a computer readable medium having stored thereon computer-executable instructions for causing the executor computer system to perform the following method:
    receiving data (a) associated with a pricing model selected by the user of the originator computer system from a plurality of options pricing models that can derive implied volatility, (b) associated with an underlyer, and (c) including a threshold condition for one of implied volatility and derivative price and calculated in accordance with the pricing model and a condition provided by the user of the originator computer system for the other one of implied volatility and derivative price;
    polling a financial data feed for calculating at least one of a financial data feed implied volatility and a financial data feed derivative price; and
    in accordance with the pricing model and said at least one of the financial data feed implied volatility and the financial data feed derivate price, determining if the threshold condition has been satisfied, and, if the threshold condition has been satisfied, identifying the trade as executable, and, if the threshold condition has not been satisfied, continuously polling the financial data feed for calculating re-priced implied volatility data and re-priced derivative price data in accordance with the pricing model until the earliest of satisfaction of the threshold condition and termination, wherein identifying as executable comprises identifying the trade as authorized by the user of the originator computer system for execution.

7. The executor computer system of claim 6, wherein the computer-executable instructions for receiving data include computer-readable instruction for receiving data compatible with the FIX protocol.

8. The executor computer system of claim 6, wherein the threshold condition is associated with a target value.

9. The executor computer system of claim 6, wherein the threshold condition is associated with at least one of a target minimum value, a target maximum value, and a target value range.

10. The executor computer system of claim 6 in combination with the originator computer system.

11. The executor computer system of claim 6, wherein said computer readable medium has stored thereon computer-executable instructions for causing said executor computer system to execute the trade if the trade has been identified as executable in accordance with satisfaction of the threshold condition.

* * * * *